United States Patent [19]

Boehne

[11] Patent Number: 4,632,596
[45] Date of Patent: Dec. 30, 1986

[54] ONE SHOT COUPLING

[75] Inventor: Hermann Boehne, Salem, Fed. Rep. of Germany

[73] Assignee: Dornier GmbH, Friedrichshafen, Fed. Rep. of Germany

[21] Appl. No.: 765,252

[22] Filed: Aug. 12, 1985

[30] Foreign Application Priority Data

Aug. 28, 1984 [DE] Fed. Rep. of Germany ....... 3431504

[51] Int. Cl.$^4$ ............................................. F16D 1/06
[52] U.S. Cl. .................................... 403/345; 403/280; 403/366; 416/2; 416/169 R; 228/114; 192/105 A; 192/103 B
[58] Field of Search ........... 192/105 A, 103 R, 103 B; 228/112, 114; 416/2, 169; 29/460, 421 E; 403/280, 345, 283, 365, 366, 367

[56] References Cited

U.S. PATENT DOCUMENTS

| 2,048,372 | 7/1936 | Carlsson et al. | 192/105 A |
| 2,519,035 | 8/1950 | Esty | 403/345 X |
| 3,476,227 | 11/1969 | Resener | 192/105 A |
| 3,508,773 | 4/1970 | Coberly et al. | 403/345 X |
| 3,565,221 | 2/1971 | Halilovac | 192/105 A |
| 4,367,838 | 6/1983 | Yoshida | 228/112 |
| 4,525,098 | 6/1985 | Krude et al. | 403/280 |

Primary Examiner—Cornelius J. Husar
Assistant Examiner—Joseph A. Fischetti
Attorney, Agent, or Firm—Ralf H. Siegemund

[57] ABSTRACT

A continuously rotating shaft is constructed as a hollow shaft with basically radially, outwardly oriented bores and rotating within a second shaft or hub; for purposes of effecting coupling a friction medium is released from the interior of the hollow shaft to pass through the bores and to fill the gap between the hollow shaft and the hub or the second shaft to effect friction a coupling under utilization of galling.

12 Claims, 4 Drawing Figures

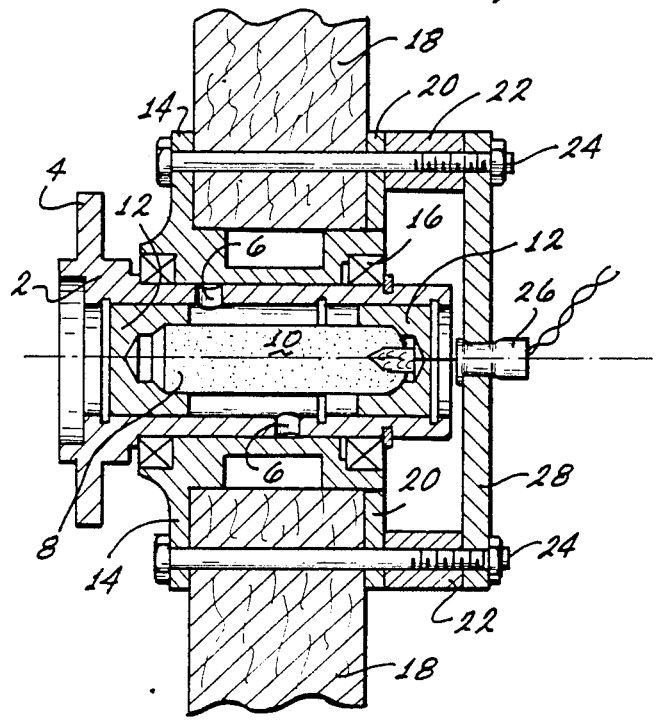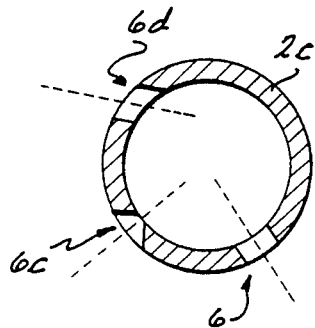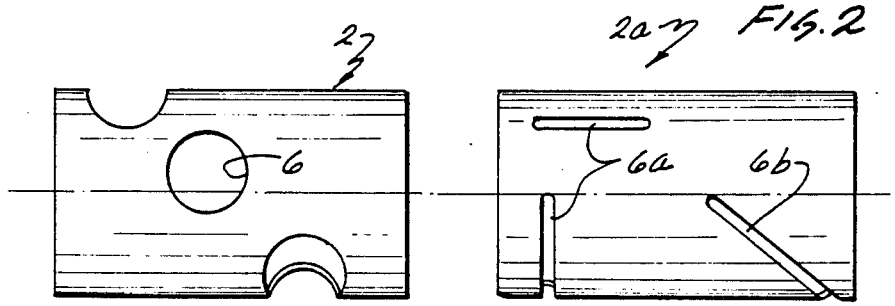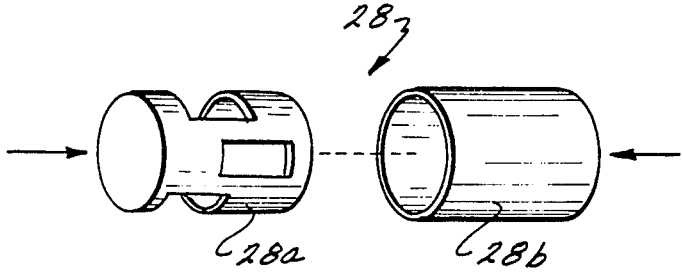

ONE SHOT COUPLING

BACKGROUND OF THE INVENTION

The present invention relates to a one shot coupling for the transmission of torque from a fast rotating shaft upon either a hub or a second shaft.

A one shot coupling is a coupling of the type in which only coupling is effected once and no disengagement or decoupling. Such type of coupling is for example used in aircraft which are started with running engines while the propeller remains stationary and wherein the motor torque is coupled to the propeller only after flight has commenced. Thereafter torque is to be transmitted with certainty for the entire duration of the flight.

DESCRIPTION OF THE INVENTION

It is an object of the present invention to provide a one shot coupling which is of low weight and can be stored for a long time, functions under poor environmental conditions and which in the decoupled state can still withstand very high differences in rotation at input and output sides. Moreover, the coupling is to effect the coupling state in a very short period of time, permitting the transmission of a high torque and should work for a long period of time without slippage.

In accordance with the preferred embodiment of the present invention the objects are attained by providing the rotating shaft as a hollow shaft with several bores, openings or perforations in its jacket. Structure is provided which releases a friction medium inside the hollow shaft and in between the hub or the second shaft on one hand, and the inserted hollow shaft on the other hand, there remains a small gap; friction medium passes through the bores, etc. and enters that gap to effect strong frictional coupling between the hollow shaft and the hub or second shaft. Preferably the perforations in the hollow shaft are round, rectangular or helical bores or perforations and they are axially offset staggered in circumferential direction. The perforations in the hollow shaft may extend in radial direction, they may have a conical configuration, or they are tilted to a radial direction, in the direction of the periphery.

The friction medium is preferably released from a glass container cooperating with an explosive release charge. Alternatively the friction medium may be contained in a tube having openings on the front end and/or along the jacket. Still alternatively the friction means may be contained in a ceramic element which has been caked together with a friction medium itself and is destroyed and crumbles when coupling is to be effected.

The friction medium is preferably silicon carbide, aluminum oxide, sand, metal cuttings or shavings, vanadium cuttings or shavings, or industry steel granules, either variety taken singly or in a blend. The hollow shaft as well as the hub should be made of steel and the surfaces facing the annular gap should have been roughened, for example by means of sandblasting. The gap width should correspond to the medium grain size of the friction or actually be smaller.

It should be realized that in essence the invention utilizes a fact which is commonly regarded as highly undesirable, namely cuttings or other small parts will enter a gap between moveable parts, i.e. parts moving relative to each other, a certain effect galling or scoring is observed. This undesired effect is used at the time coupling is to be effected, in that in accordance with the invention friction means such as metal cuttings or the like are released inside the rotating drive shaft, and through centrifugal force they pass the bores and reach the gap between the perforated shaft and the hub or shaft to be driven. These cuttings, shavings or granules cause scoring and galling, so that as a consequence a frictional connection obtains, amounting in effect to a cold welding or a friction welding, as between drive shaft and shaft or hub to be driven. This kind of connection is basically an irreversible process and is therefore not reproducible, but on the average it is so strong and so widely effective that once the connection is made there will be no relative motion any longer between the two shafts, i.e. for example between a crank shaft and a propeller. Any slippage is negligible even during long runs.

The friction medium distributes particularly uniformly in the gap, if the perforations in the hollow shaft are axial bores arranged in a staggered relation in circumferential direction. Owing to simple manufacture the perforation may be round bores, alternatively they may be oval, rectangular or helical produced for example through cutting or sawing into the hollow shaft. The bores or perforations may traverse the hollow shaft in radial direction and may be straight or widened conically in a radial outward direction in order to increase any clamping effect of wedge like surfaces; wedge surface are also obtainable if the perforations do not run generally straight radial but are tilted in the circumferential direction relative to a radial line.

As stated a variety of elements can be used for releasing the friction element. For example a release squib may explode, and destroy a glass container to release the metal cuttings, sand or the like. Alternatively, a little tube is provided covered with a lid and or has perforations closed with a sleeve. This tube is opened for example by removing the cover or pulling off the sleeve, mechanically or through explosive so that the friction medium contained in the little tube is released. The caking together of friction means in a ceramic carrier such as silicon carbide, or aluminum oxide has been mentioned and again through an explosive this basically solid body may be crumbled, so that it will break-up into many small parts. This kind of body should be brittle and obtainable for example by means of tension bias, such as is known for safety glass.

The shafts and hub can be made of steel, but one may also use other conventional material such as brass, copper, aluminum or alloys. Respective surfaces that couple should be roughened by sand blasting.

Also, it should be mentioned that the friction means could be regularly shaped spheres, globes (globules) or irregular parts such as cuttings. The invention is of light weight and is thus quite suitable in aircraft engineering. Manufacture is quite favorable because one does not need tight tolerances. Owing to the large engaging and active surfaces very large forces can be transmitted without slippage. The coupling moreover is in fact amenable to long storage because no part that may experience fatigue such as springs are employed.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a cross section through a coupling constructed in accordance with the preferred embodiment of the present invention for practicing the best mode thereof;

FIG. 2 and FIG. 3 illustrate in side and cross sections different configurations for the hollow shaft used in the device of FIG. 1; and FIG. 4 is an alternative example for effecting the release of a friction medium used in the coupling shown in FIG. 1.

Proceeding now to the detailed description of the drawings, FIG. 1 illustrates a one shot coupling for coupling a shaft to a propeller; the coupling being constructed in accordance with the preferred embodiment of the present invention. It is assumed specifically that the drive shaft, i.e. the shaft which extends from the engine (e.g. a crank shaft) is constructed as a hollow shaft 2. This hollow shaft is provided with a flange 4 where it faces the engine.

In addition the shaft has a cylindrical jacket sleeve or tubular portion being provided with six bores 6. The configuration and alternative configuration of these bores, as well as specifics of the arrangement will be described more fully below.

Inside hollow shaft 2 is provided a glass container 8, which is filled with a friction medium 10, and is centered inside of sleeve 2, by means of two centering pieces 12. Generally speaking the content of the glass container 8 could be silicon carbide, aluminum oxide, sand, metal cuttings, shavings or clippings, or cuttings, shavings or clippings of vanadium, or granules used in industry generally, made of steel.

The shaft to be driven, in this case a propeller hub 14 is mounted by means of two bearings 16 for rotation upon the sleeve and hollow shaft 2. A wooden propeller 18 for example is affixed to the hub 14 by means of bolts 24. The connection however includes a follower disk 20, spacer sleeves 22 and a trigger squib holder 28 for a release squib 26 which is disposed right in front of the glass container 8.

An alternative form not shown may exist in a configuration in which the container for the friction medium such as a glass container is fastened to the stationary part, namely the propeller hub 14 and will not rotate as long as the coupling is not completed. However, the ampulla 8 must still project into the sleeve 2. Thus this configuration is structurally somewhat more complicated but the danger of erroneous releases in triggering is reduced.

FIG. 1 illustrates the coupling in a decoupled or disengaged state. The hollow shaft 2 rotates, being driven by a motor or engine via the flange 4, and the rotation occurs particularly vis-a-vis the hub 14. In order to effect coupling the squib 26 is electrically triggered and the shock waves from the explosion destroys the glass container 8 (or alternatively, it crumbles a similarly configured ceramic-friction medium cake). Accordingly friction medium 10 is released and by operation of the centrifugal force is forced radially outwardly to reach bores 6, it will pass through the bores and in between the gap between the hub 14 and the sleeve 2. As a consequence galling and scoring occurs and a frictional connection is completed between the parts 2 and 14. The propeller 18 will be rapidly accelerated and is now positively coupled to the rotating shaft 2.

FIG. 2 illustrates two different versions for the hollow shaft, the other one being denoted by a reference numeral 2a. The left hand portion in FIG. 2 is representative of the configuration shown also in FIG. 1, the bores 6 illustrated here are round, they extend in radial direction and they are staggered around the periphery in axial direction. The alternative form illustrated with reference to a hollow shaft 2a shows rectangularly configured perforations 6a, whereby different versions are possible and feasible and they are all shown here. They may extend axially, peripherally or in oblique direction, i.e. helically.

FIG. 3 illustrates again a hollow shaft 2c with different types of bores. The bore 6 is a straight one and corresponds to the bore shown in FIG. 1 or 2, i.e. the axis of such a bore 6 is a radial line. An alternative configuration for a bore or perforation is identified by reference character 6c; it shows a conically, radially outward increase in diameter of the bore.

Finally the bore 6d has an axis which is not a radial line but is provided with an angle relative to such a line, and is thus tilted in circumferential direction. Moreover it can be seen that either of the perforations 6c or 6d have in effect wedging surfaces, which participate and contribute in the friction coupling as between the parts 2 and 4 (or 2a or 2c and 14).

FIG. 4 illustrates an alternative version for storing and releasing friction medium. The device 28 illustrated here is to be used in lieu of the glass container with the explosive fracturing charge as shown in FIG. 1. Rather the device 28 is comprised of a small tube 28a having a perforation as illustrated and being filled with cuttings, clippings, powder etc. of the type referred to above. In order to retain the friction medium in that container a sleeve 28b is slipped on top of tube 28a which in effect closes the perforations. In order to effect coupling the sleeve 28b is pulled off. This may be done for example electro magnetically through a solenoid or the like.

In the following an actual example that has been used in practice for a coupling of the type shown in FIG. 1 will be described. The coupling is constructed basically as shown, and weighs about 200 grams. The container 8 is a usual injection type ampulla containing about 5 milliliters powder etc. The ampulla is filled to about ⅔ of its volume with vanadium cutting, corresponding to a 1.27 grain size, there being about 11 gram vanadium in the ampulla. In other instances for example 18 gram industrial steel grain is included of a grain size from 0.25 to the 0.5, and called steel grain robe of "Eisenwerk Wuerth" of Bad Friedrichshall, Fed. Rep. of Germany can be used. The friction surfaces, i.e. the outer periphery of the sleeve 2 and the inner periphery of the hub 14 have been roughened by means of sand blasting. During idling the coupling can withstand up to 10,000 revolutions per minute. The coupling obtains within the first millisecond following the ignition of the squib. This kind of coupling is actually reproducible. As all self-locking couplings, coupling obtains of course in very abrupt manner when completed. But a test engine such as a combustion engine did not exhibit any problems. The total period of coupling, amounts to about 15 milliseconds and is thereafter quite equivalent to positive coupling because of cold welding processes that occur in between the surfaces, being connected into by the friction medium. In a long lasting test for 3 hours it was found that the coupling was able to transmit a torque of 300 newtons per meters with negligible slippage.

The invention is not limited to the embodiments described above, but all changes and modifications thereof, not constituting departures from the spirit and scope of the invention, are intended to be included.

What is claimed is:

1. One shot coupling for the transmission of torque from a first, fast rotating shaft to another second shaft or hub, comprising:

the first shaft being a hollow shaft having several radially outwardly oriented perforations or bores and being inserted in said hub or second shaft with relatively small clearance;

means containing a friction medium and being disposed and held in the interior of said hollow shaft; and means for providing controlled release of the friction medium in said container independent from commencement of rotation of the first shaft, the friction medium being radially outwardly dispersed, passing through said perforations and in between said hollow shaft and said hub or second shaft to effect coupling in between.

2. Coupling as in claim 1, said perforations being staggered round bores.

3. Coupling as in claim 1, said perforations being staggered rectangular bores.

4. Coupling as in claim 1, said perforations being helical section type bores.

5. Coupling as in claim 1, wherein said bores having an axis inclined to a radial direction.

6. Coupling as in claim 1, wherein said bores are of conical configuration.

7. Coupling as in claim 1, wherein said containing means is a glass container, the means for releasing being a triggerable explosive charge.

8. Coupling as in claim 1, wherein said containing means includes a tube with perforations, there being a sleeve on said tube and being removable therefrom for obtaining the release.

9. Coupling as in claim 1, wherein said friction medium is one or more of the following: silicon carbide, aluminum oxide, sand, metal cuttings, vanadium cutting or industry steel grain.

10. Coupling as in claim 1, wherein said shaft and said hub or second shaft are made of steel surfaces facing the gap between them, having been roughened by sandblasting.

11. Coupling as in claim 1, wherein said gap has a width equal or below the average grain size of the friction medium.

12. One shot coupling for the transmission of torque from a first, fast rotating shaft to another second shaft or hub, comprising:

the first shaft being a hollow shaft having several radially outwardly oriented perforations or bores and being inserted in said hub or second shaft with relatively small clearance;

means containing a friction medium and being disposed and held in the interior of said hollow shaft; and means for providing controlled release of the friction medium in said container independent from commencement of rotation of the first shaft, the friction medium being radially outwardly dispersed, passing through said perforations and in between said hollow shaft and said hub or second shaft to cold or friction weld the first shaft to the hub or the second shaft and thereby effect coupling between them.

* * * * *